United States Patent Office

3,534,986
Patented Oct. 20, 1970

3,534,986
PIPE JOINT
Franz-Josef Hartmann, Heinz Menne, and Eckehard Hanert, Paderborn, and Helmut Benteler, Bielefeld, Germany, assignors to Benteler-Werke AG, Schloss Neuhaus, Kreis Paderborn, Germany
Filed Sept. 9, 1968, Ser. No. 758,326
Claims priority, application Germany, Sept. 9, 1967, 1,625,931
Int. Cl. F16l 9/14, 13/08
U.S. Cl. 285—55  8 Claims

ABSTRACT OF THE DISCLOSURE

A pipe joint comprises a first tubular member having an open first end portion. A second tubular member having an internal face and including an open second end portion telescoped into the first end portion and having an end face, the second tubular member consisting of a material subject to corrosion and being provided with a corrosion-resistant coating only on the internal face so that the end face is unprotected against corrosion. An annular member of corrosion-resistant material overlies the end face within the first end portion. Means is provided the annular member to the end face and to the inner circumferential surface of the first end portion whereby to prevent access to the end face of corrosion-effecting fluid passing through the tubular members.

BACKGROUND OF THE INVENTION

The present invention relates to pipe joints.

Pipe joints are known wherein a steel tube or pipe, which is internally plated or coated with copper or copper alloy for corrosion protection purposes, is to be connected with another pipe, a fitting, an armature, a connecting piece or the like which consists of a noncorroding solderable metal, usually copper or the like. Such joints are especially prevalent in warm-water installations and the end of one conduit or pipe is received in an enlarged portion of the other conduit or pipe. Usually, the end of the internally plated steel pipe is received in a socket formed on the fitting or other pipe, or whatever member may represent the other element of the joint. The internal surface of the fitting—as this other element will hereafter be assumed to be for the sake of convenience in identification—is thus juxtaposed with a portion of the outer surface of the internally plated steel pipe. These surfaces are then connected over the entire axial length of their juxtaposition and over the entire circumference by means of a soft solder, usually a tin solder.

The problem with this type of joint is the fact that the plating of the steel pipe is only at the inner circumferential surface thereof but does not cover the axial end face located within the confines of the fitting. After all, such plated tubes are made in large quantities and in great lengths and are cut to size when needed, so that a given end face to be protected really comes into existence only when such a cut is made. It is for this reason that it is virtually impossible to provide for plating of the end face.

The absence of such plating on the end face creates problems. Evidently, the largest surface area of the end face will consist of steel which is in direct contact with the contents of the pipe, that is with the fluid flowing therethrough, hereafter assumed to be warm water. This warm water simultaneously contacts the plating on the inner circumferential surface of the steel tube, which plating consists of copper or a copper alloy, as well as the fitting or other element of the joint will also consist of copper or copper alloy. Because of its natural salt content the warm water thus acts as an electrolyte and in conjunction with the end face of the pipe which consists in large part of exposed steel, and with the other surfaces which it contacts and which consists of copper or copper alloy, it constitutes a galvanic element. The resulting currents cause the phenomenon known as contact corrosion, with the steel of the pipe going into solution and becoming destroyed. As the steel disappears the usually extremely thin plating layer of copper or copper alloy can no longer withstand normal mechanical stresses acting upon the joint, particularly the water pressure, and leaks or complete severing of the joint result.

Attempts to overcome this problem have been numerous, but have not been successful. One such attempt has been to bevel the end face of the steel pipe and to provide an internal shoulder in the fitting against which the bevelled end face of the pipe is abutted. The result is the formation of a rather large annular gap between the shoulder and the bevelled end face of the pipe, and solder is introduced into this gap in order to thus cover the bevelled end face of the pipe. The problem with this attempted solution is the fact that it is extremely difficult to completely fill this annular gap with solder, it being evident that if the gap is not completely filled the water will still have access to portions of the steel at the end face of the pipe and corrosion will proceed as before. On the other hand, even if it is possible to completely fill the annular gap, it is almost entirely impossible to prevent the solder from restricting the free internal cross section of the pipe. Many attempts have been made to obtain a satisfactory solution on this basis but wherever it was possible to fill the annular gap completely, the solder invariably ran out of the gap into the interior of the pipe and restricted the free internal cross section. Evidently, this is not tolerable.

A further problem in this connection is the fact that it is very difficult to introduce a significant quantity of solder, an operation which usually involves introducing the solder from the exterior between the juxtaposed internal and external surfaces of the fitting and of the pipe, respectively, while maintaining the solder and both the fitting and the pipe at soldering temperature. This requires an inordinately long period of time because the solder can be introduced only by capillary action unless the differential between the outer diameter of the pipe and the inner diameter of the fitting is so large that there is significant play between the two. In the latter case, however, the pipe joint clearly has a very low mechanical strength and this also is not acceptable.

Nor is it a solution to introduce the solder prior to insertion of the pipe into the fitting, for the aforementioned reason that the solder then tends to run out of the annular gap when heated and to restrict the internal cross section.

It is therefore an object of the present invention to overcome these disadvantages and to provide a pipe joint which is not subject to them.

SUMMARY OF THE INVENTION

In pursuance of this object and others which will become apparent hereafter, one feature of my invention resides in the provision of a pipe joint which comprises a first tubular member having an open first end portion, a second tubular member having an internal force and including an open second end portion telescoped into the first end portion and having an end face, the second tubular member consisting of a material subject to corrosion and being provided with a corrosion-resistant coating only on the internal face so that the end face is unprotected against corrosion, an annular member of corrosive-resistant material overlies the end face within the first end portion, means is provided the annular member to the end face and to the inner circumferential surface of the first end portion whereby to prevent access to the end face of corrosion-effecting fluid passing through the tubular members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
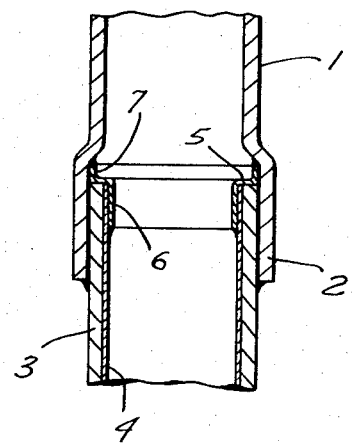
FIG. 1 is a somewhat diagrammatic longitudinal section illustrating an embodiment of the invention in a two-pipe joint.

In FIG. 1 a pipe 1 consists of copper or a copper alloy and has an end portion 2 whose internal diameter is increased beyond that of the remainder of the pipe 1 so as to constitute a fitting. A second pipe 3 partly projects into the end portion 2 and consists of steel which is internally plated with copper or a copper alloy, the plating layer being identified with reference numeral 4.

In accordance with our invention the exposed end face of the pipe 3, that is the end face located in the end portion 2 of the pipe 1, is covered by a thin-walled annular member, namely a ring 5 consisting of a metal not subject to corrosion and covered with soft solder or tin. The end face of the ring 5 facing the end face of the pipe 3 is connected with this surface by being soldered thereto with the soft shoulder or tin. A projecting collar portion 6 provided on the ring 5 extends into the interior of the pipe 3 abutting the plating layer 4 thereof. A similar collar 7 projects into the end portion 2 of the pipe 1 abutting against the internal surface of the latter. Both the collar 6 and the collar 7 are respectively connected with the layer 4 of the pipe 3 and with the internal surface of the end portion 2 of the pipe 1 by means of the soft solder in the ring 5.

Furthermore, the surfaces of the pipe 3 and of the portion 2 of the pipe 1, that is the internal surface of the latter and the external surface of the former, are soldered together with a soft solder which is introduced from the exterior by capillary action when such solder is applied to the open end of the portion 2 and when the latter and the pipe 3 are heated to soldering temperature. It will be appreciated that with the provision of the ring 5 the originally exposed steel at the end face of the pipe 3 is completely and reliably protected against contact by the water or other liquid or fluid circulating through the joint.

Figure 2:
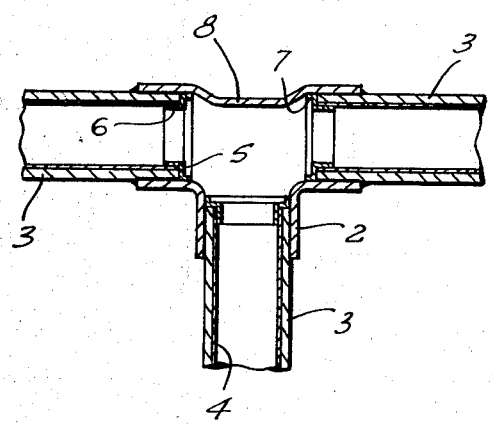
FIG. 2 is a view similar to FIG. 1 and illustrating the same embodiment of the invention on the example of a three-pipe joint utilizing a T-fitting.

In the embodiment of FIG. 2 the inventive concept is again illustrated, but here on the basis of a three-pipe joint. Each of the three pipes to be connected is identified with reference numeral 3 and each corresponds to the pipe 3 shown in FIG. 1. In other words, each pipe 3 consists of steel and is provided with an internal plating 4 of copper or a copper alloy. The pipe 1 of FIG. 1 is replaced in the embodiment of FIG. 2 with a T-shaped fitting 8 of conventional construction and consisting of copper or a copper alloy. The exposed end faces of the respective pipes 3 are again covered by rings 5 which correspond in their construction and in the manner in which they are fixed to the respective pipes 3 and to the fitting 8 to what has been discussed above with respect to FIG. 1. Also, the solder connection between the exterior surfaces of the pipes 3 and the interior surfaces of the fitting 8 is the same as discussed above with respect to the solder connection between the interior and exterior surfaces of the portion 2 and the pipe 3, respectively.

The advantages of our invention will be readily apparent from a consideration of what has been set forth with respect to the prior art, and from a consideration of the exemplary embodiments shown in FIGS. 1 and 2. Firstly, the ring 5 reliably covers the exposed steel portion of the end face of the steel pipe 3, or in the embodiments of FIG. 2, the end faces of the several steel pipes 3. Intrusion of water or other fluid between the ring, which latter advantageously consists of copper or a copper alloy, and the exposed steel at the end face of an associated pipe 3 is impossible because of the solder connection between the two. Thus, the water or other liquid acting as electrolyte can no longer contact the steel, but only copper or a copper alloy and the soft solder. In the electromechanical series copper and copper alloys are relatively close to soft solder in that the normal potential between the same is only insignificantly different; as a result warm water is not sufficient as an electrolyte to produce a significant corrosion current so that contact corrosion between soft solder and copper or copper alloy cannot occur.

Furthermore, the assembly of our novel pipe joint is much simpler than anything that has become known heretofore in this particular line. It is only necessary to cut the tube or pipe 3 in conventional manner, that is to give it a straight cut to provide an exposed metallic end face which need not even be entirely smooth because small unevennesses on the end face will be compensated by the soft solder. The ring 5 consisting, as pointed out before, of a noncorroding metal advantageously copper or a copper alloy, is coated with a quantity of soft solder which is just sufficient to provide the desired soldering effect. This ring, whose construction has already been discussed above, can be readily soldered to the exposed end face of the pipe 3 prior to introduction of the latter into the fitting or analogous element. On the other hand, it is also possible to press the ring a small distance into the open end of the fitting or analogous element and thereupon to push it further in with the end face of the pipe 3. This approach may be used if it is not desired or practical to solder the ring 5 to the end face of the pipe 3 prior to introduction of the latter into the fitting. Of course, if this approach is used it is then necessary that the inner diameter of the fitting and the outer diameter of the ring be so selected with reference to one another that the ring will not penetrate any further into the fitting than it is advanced by pressure with the pipe 3. If this type of assembly operation is used, the ring and the exposed end face of the pipe 3 will be in tight contact with one another inside the fitting and can be connected inside the fitting by heating from the exterior, whereby the solder will be raised to proper temperature and the ring will be soldered to the exposed end face of the pipe 3 interiorly of the fitting. In no case, however, is it necessary to provide internally of the fitting an abutment shoulder as has heretofore been required. Nevertheless, reliable contact prevention between the water or other fluid and the steel of the end face of the pipe 3 is assured.

It was pointed out above that only a relatively small quantity of soft solder is used to coat the ring 5. This insures that there is not sufficient solder present to restrict or close the free internal cross section when the solder is heated, as occurs frequently in the known type of pipe joint. Only enough solder is required in the present case for coating the ring 5 to assure that on heating a solder connection will be established between the ring 5 and the end face of the pipe 3 on the other hand, and between the collar portions 6 and 7 of the ring and the respective surfaces of the pipe 3 and the fitting on the other hand.

A further advantage of our novel pipe joint is the fact that there need not be any significant play between the juxtaposed external surfaces of the pipe 3 and the internal surface of the fitting. The reason for this is that it is no longer necessary to introduce large quantities of soft solder from the exterior into the space between these juxtaposed surfaces under simultaneous heating to soldering temperature. After all, the necessary quantity of solder to effect the requisite soldering connection between the ring 5, the pipe 3 and the fitting or analogous element is already provided in the ring itself so that only enough solder must be introduced between the juxtaposed internal and external surfaces of the fitting and pipe 3, respectively, to provide a solder connection between these two elements. As a result of the very small gap necessary between these surfaces for this purpose the thickness of the introduced soft solder in this gap is small and the thus-obtained joint is particularly strong and can withstand significant mechanical stresses.

It will be appreciated that the collar portions 6 and 7 can be eliminated. When they are provided they will advantageously have a small wall thickness so as not to contribute to a reduction in the free internal cross section. They do provide a proper centering of the ring on the end face of the pipe 3 and make it considerably simpler to solder the ring onto this end face concentrically therewith. Also, they make the introduction of the ring into the pipe fitting or analogous element much simpler, particularly if the internal diameter of the pipe fitting with reference to the external diameter of the ring is somewhat too large. Of course, the edge between the internal surface of the pipe 3 and the end face of the pipe 3 is still more reliably protected by this expedient, so that a reliable protection against intrusion of water or other fluid is guaranteed even if a bad solder joint should exist between the ring and the end face of the pipe 3.

The comments above have been directed specifically to the collar portion 6 which extends into the interior of the pipe 3. Evidently, the ring 5 may not only be provided minus both of the collar portions 6 and 7, but it may also be provided with the collar portion 6 alone or with the collar portion 7 alone. The advantage of the collar portion 7 is to provide a still more reliable safeguard against the contact of water with the end face of the pipe 3, an occurrence which in this case is completely precluded.

The ring 5 consists, as pointed out before, of copper or a copper alloy which may be tinned or coated with soft solder. However, it is of course possible to use other metals or alloys as long as they are metals or alloys which are not subject to corrosion and which in the electrochemical series are not too far removed from the metal or the alloy with which the inner surface of the pipe 3 is plated and/or of which the fitting or analogous element consists. The soft solder, such as tin or the like, is advantageously provided on the ring 5 by dipping the same into a bath thereof.

The invention is directed not only to the novel pipe joint per se, but also to a method of making or assembling such a pipe joint, wherein a thin-walled ring of a non-corroding solderable metal is initially covered with a relatively thick coating of soft solder or tin, and is then introduced in conjunction with the free end of the pipe 3 having thereon the exposed end face into the pipe fitting or analogous element, whereupon the pipe joint is heated to soldering temperature to thereby effect soldering of the ring to the end face of the pipe 3 and, if the collar portions 6 and 7 are provided, to the internal surface of the pipe 3 and the internal surface of the pipe fitting, while at the same time introducing additional soft solder from the exterior into the juxtaposed internal and external surfaces of the pipe fitting and the pipe 3, respectively.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pipe joint, comprising a first tubular member having an open first end portion; a second tubular member having an internal face and including an open second end portion telescoped into said first end portion and having an end face, said second tubular member consisting of a material subject to corrosion; a corrosion-resistant coating provided only on said internal face of said second tubular member so that said end face thereof is unprotected against corrosion; a discrete annular member of corrosion-resistant material overlying said end face within said first end portion, said annular member having inner and outer circumferential edge portions and including at least one sleeve-shaped tubular extension projecting axially from said inner circumferential edge portion into said open second end portion and into abutment with said coating, said annular portion having in axial direction of said tubular members and said sleeve-shaped tubular extension having in radial direction of said tubular members a thickness less than the radial thickness of said first and second tubular members; and means bonding said annular member at least to said end face and to the inner circumferential surface of said first end portion whereby to prevent access to said end face of corrosion-effecting fluid passing through said tubular members.

2. A pipe joint as defined in claim 1, said means being a coating of soft solder on said annular member.

3. A pipe joint as defined in claim 1; and further comprising an additional sleeve-shaped extension projecting axially of said annular member from said outer circumferential edge into said first tubular member and being bonded to the inner circumferential surface of the latter.

4. A pipe joint as defined in claim 1, said annular member being composed at least predominantly of copper.

5. A pipe joint as defined in claim 1, said annular member being at least predominantly composed of copper, and said means comprising a coating of tin provided on said annular member.

6. A pipe joint, comprising a first tubular member having an open first end portion bounded by an inner circumferential surface; a second tubular member having an internal face and including an open second end portion telescoped into said first end portion and provided with an outer circumferential surface juxtaposed with said inner circumferential surface and with an end face, said second tubular member consisting of a material subject to corrosion; a corrosion-resistant coating only on said internal face so that said end face is unprotected against corrosion; an annular member of corrosion-resistant material overlying said end face within said first end portion, said annular member having inner and outer circumferential edge portions and including a pair of sleeve-shaped tubular axial extensions projecting from said outer and inner edge portions into said first and second tubular members, respectively, said axial extensions having a radial thickness less than the radial thickness of said first and second tubular members, said tubular extensions being bonded to the respective circumferential surface and said annular member to said end face so as to prevent access to said end face of corrosion-effecting fluid passing through said tubular members.

7. A method of making a pipe joint, comprising the steps of coating an inner circumferential surface of a first tubular member with a layer of corrosion-resistant material while leaving an end face of said first tubular member exposed; coating an annular member of corrosion-resistant material with a relatively thick layer of solderable bonding agent, said annular member having inner and outer diameters corresponding at least substantially to the corresponding dimensions of said first tubular member; said annular member having at least one sleeve-shaped tubular extension projecting axially from said inner diameter portion into said first tubular member and into abutment with said coating on said first tubular member; placing said end face into abutting engagement with said annular member and pushing the latter into an open end portion of a second tubular member by telescoping said first member partly into said end portion; said annular portion having in axial direction of said tubing members and said sleeve-shaped tubular extension having in radial direction of said tubular members a thickness less than the radial thickness of said first and second tubular members; heating said end portion to soldering temperature to thereby effect bonding of said bonding agent with said end face and with an inner circumferential surface of said second tubular member; and introducing additional bonding agent between the juxtaposed inner and outer circumferential surfaces of said first and second tubular members.

8. A method as defined in claim 7, wherein the step of coating said annular member comprises dipping the same into a bath of the bonding agent.

References Cited

UNITED STATES PATENTS

| | | | |
|---|---|---|---|
| 590,811 | 9/1897 | Storrow | 285—55 |
| 2,132,574 | 11/1938 | Moise | 285—55 |
| 2,174,218 | 9/1939 | Greene | 285—287 |
| 2,513,365 | 7/1950 | Rogoff | 285—287 X |
| 2,888,783 | 6/1959 | Turnbull | 285—287 X |
| 3,107,421 | 10/1963 | Turnbull | 285—287 X |
| 3,427,050 | 2/1969 | Krieg | 285—55 |

FOREIGN PATENTS 669,311    8/1929    France.

DAVE W. AROLA, Primary Examiner

U.S. Cl. X.R.

29—489, 502; 285—287